Patented Aug. 7, 1951

2,563,771

UNITED STATES PATENT OFFICE 2,563,771

CARBONATES OF UNSATURATED DIOLS

David E. Adelson, Berkeley, Calif., assignor to Shell Development Company, San Francisco, Calif., a corporation of Delaware No Drawing. Application December 23, 1946, Serial No. 718,131

19 Claims. (Cl. 260—77.5)

This invention relates to a new class of polymerizable compounds, to a method for their preparation and to their polymers and copolymers. More particularly the invention relates to carbonates of unsaturated, dihydric alcohols, to a method for their preparation and to their polymerization, and to the resulting polymers and copolymers.

More specifically the invention may be described as relating to the production of carbonates of unsaturated diols and to the polymerization of the new compounds to produce resinous products possessing the highly desired properties of having an improved toughness and general resistance to deteriorating influences, such as light and heat, which enables the polymers to be used for many industrial applications for which the prior art resins are inferior in performance or are entirely unsuited for the intended purpose.

Carbonic acid esters of monohydric and polyhydric saturated alcohols are known in the art and have shown some promise in the production of resinous products. However, many of the polymers of the known esters of carbonic acid and the saturated monohydric and polyhydric alcohols are highly restricted in their use because of their undesirable qualities of either being too soft or having a poor resistance to deteriorating influences such as light, heat, etc. Such resins cannot be used to produce, for example, any hard castings or molded objects or any objects that require lathing or drilling or have to be exposed for long periods of time to extreme weather conditions or long exposure to heat or light. A carbonic acid ester that could be polymerized to a resinous product having a tough, highly resistant surface would, therefore, be highly desired in the art as the production costs of the polymers would be relatively low and the resulting products could be molded, cast, milled and lathed into many shaped objects which are in great demand in industry.

It is an object of the invention to provide a new class of esters of carbonic acid capable of being polymerized to produce resins possessing the above-described properties. It is a further object to provide a method for the production of the new class of carbonic acid esters. It is another object of the invention to provide polymers and copolymers of the new compounds which have improved strength and general resistance to deteriorating influences such as light and heat and can thus be used in many industrial applications requiring a high quality performance of the resinous product. Other objects of the invention will be apparent from the detailed description given hereinafter.

It has now been discovered that carbonic acid esters of unsaturated dihydric alcohols, possessing an olefinic linkage between two carbon atoms of aliphatic character at least one of which is not more than two carbon atoms removed from a hydroxy-bearing carbon atom may be readily polymerized to resinous products possessing a hard texture and an improved general resistance to weather conditions and long exposure to light and heat which properties enable the polymers to be used in many industrial applications requiring a high quality performance. It has been further discovered that the carbonic acid esters of the above-described unsaturated diols may be readily copolymerized with other unsaturated organic compounds to produce resinous material having the same desired properties as the above-described polymers and capable of being used for the same industrial purposes more fully described hereinafter. Such a discovery was quite unexpected in view of the fact that the unsaturated dihydric alcohols such as the butenediols have been known to tend to lend a rubber-like, low weather resistant quality to the polymers of the compounds in which they had been incorporated rather than assisting in the hardening of the material and improving its general resistance to weather and other deteriorating action.

The compounds of the invention may be broadly described as carbonates of unsaturated, dihydric alcohols. More specifically they may be described as carbonic acid esters of unsaturated diols wherein an unsaturated, dihydric alcohol which possesses an olefinic linkage between two carbon atoms of aliphatic character at least one of which is not more than two carbon atoms removed from a hydroxy-bearing carbon atom, is esterified at both hydroxyl groups by carbonic acid molecule or molecules. When the two hydroxyl groups of the unsaturated diol are joined to carbon atoms which are less than two carbon atoms apart one molecule of carbonic acid will usually be sufficient to esterify both hydroxyl groups giving rise to a ring-type structure. Such ring structures may be represented by the following structural formula

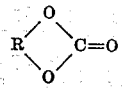

wherein R is a bivalent organic radical derived from an unsaturated, dihydric alcohol containing at least one double bond of aliphatic character not more than two carbon atoms removed from a hydroxy-bearing carbon atom.

When the two hydroxyl groups of the unsaturated diol are joined to carbon atoms which are more than one carbon atom apart two molecules of carbonic acid will usually be required to esterify both hydroxyl groups as the use of only one molecule of acid to esterify both groups would give rise to a strained 7 or more membered ring which would be difficult to form and would be very unstable. Compounds of the invention containing two molecules of the carbonic acid will have the structure

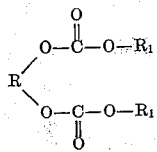

wherein R is a bivalent organic radical derived from an unsaturated, dihydric alcohol containing at least one double bond of aliphatic character not more than two carbon atoms removed from a hydroxy-bearing carbon atom, and each $R_1$ is the same or different substituent selected from the group comprising a hydrogen atom or an organic radical.

The R of the above-described general structural formulae is derived theoretically and practically from unsaturated dihydric alcohols. The unsaturated diols may be cyclic or acyclic and may be substituted or unsubstituted. The alcohols must of course have the characteristic structure of being dihydric and having at least one olefinic linkage between two carbon atoms of aliphatic character at least one of which is not more than two carbon atoms removed from a hydroxy-bearing carbon atom. Dihydric alcohols wherein the unsaturatedness is of an aromatic character are not embraced by the invention as they fail to produce products having the above-described superior properties.

Representative examples of unsubstituted unsaturated diols which may be used to produce the compounds of the invention are, 1-butenediol-1,4, 1-cyclopentendiol-3,4, 1-cyclopentendiol-2,3, 2,4 - pentadienediol-3,5, 2,4-heptadienediol-1,4, 1,5-octadienediol-2,6, 1-cyclohexenediol-3,5, 1,4-cyclohexadienediol - 3,5, 1,3-cyclohexadienediol-2,5, 1,5-tridecadienediol-2,4, 2-(hydroxymethyl)-1-propene - 3 - ol, 3-phenyl-1-butenediol-1,4, 5-butyl-1-hexenediol-3,5, etc.

The above-described unsaturated diols may have one or more of the hydrogen atoms replaced by suitable organic or inorganic substitutents which do not interfere with the reaction of the alcohol with the carbonic acid and the resulting compounds later polymerization. Suitable non-interfering groups are the halogen atoms, ether group, sulfone group, nitroso group, the sulfate, sulfite, nitrate and nitrite radicals and similar groups. The alcohols may be still further substituted with heterocyclic radicals wherein the ring contains oxygen, sulfur, or nitrogen atoms such as the furfuryl, thiophenyl, sulfolanyl and pyridinyl radicals. Representative examples of the substituted unsaturated diols that can be used to produce the compounds of the invention are 2-chloro-1-cyclopentendiol-3,4, 3-acetoxy - 1 - butenediol-1,3, 3-bromo - 2 - pentenediol-3,5, 3-acetyl - 2 - butenediol-1,4, 5-butoxy-1-cyclohexenediol-3,5, 5-nitroso-2,4-heptadienediol-1,4, 3-chloroethyl-2-butenediol - 1,4, 4-nitro-2-pentendiol-3,5, 5-sulfolanyl-2,4-heptadienediol-1,4, etc.

A preferred group of the unsaturated diols are the open chain dihydric alcohols having from 2 to 20 carbon atoms and having at least one double bond of aliphatic character not more than two carbon atoms removed from one of the hydroxy-bearing carbon atoms and having approximately one double bond for each 6 carbon atoms in the chain. Representative examples of the preferred group of unsaturated diols are 1-propenediol-2,3, 2-propenediol-1,3, 1-butenediol-1,4, 2-butenediol-1,4, 2-butenediol-1,3, 1-butenediol-3,4, 2-pentenediol-3,5, 2,4-pentadienediol-3,5, 2,4-heptadienediol-1,4, 2,6-octadienediol-3,5, 3-pentenediol-1,4, 3-pentenediol-2,5, 1-hexenediol-3,6, 2,4-hexadienediol-3,5, etc.

The $R_1$ of the general structural formula of the compounds of the invention wherein 2 molecules of carbonic acid are used to esterify the dihydric, unsaturated alcohol may be an organic radical. Preferred organic radicals are the hydrocarbon radicals and the substituted hydrocarbon radicals. Such radicals may be cyclic or acylic, saturated, unsaturated or aromatic, such as the alkyl, alkenyl, aryl, alkenaryl, aralkyl, aralkenyl, cycloalkyl and cycloalkenyl radicals. Examples of the substituted or unsubstituted hydrocarbon radicals are methyl, ethyl, butyl, hexyl, phenyl, allyl, methallyl, methyl vinyl carbinyl, diphenyl, naphthyl, 2-chloro-butyl, cyclohexenyl, etc. These radicals are derived practically or theoretically from their respective alcoholic derivative which is used to esterify the carbonic acid molecule.

A particularly preferred group of radicals which $R_1$ may represent in the general structural formula of the dicarbonate esters of the unsaturated diols described above are the open chain hydrocarbon radicals derived practically or theoretically from alcohols containing from 1 to 18 carbon atoms. The preferred radicals or alcohols may be saturated or unsaturated and substituted or unsubstituted. Examples of the saturated alcohols are methyl alcohol, sec-butyl alcohol, pentyl alcohol, 2-chloropropan-1-ol, octanol, 2,3,5-trimethyl octan-1-ol, etc. Particularly preferred unsaturated alcohols are those beta,gamma-olefinic unsaturated alcohols containing from 3 to 18 carbon atoms, the carbon atom bearing the hydroxyl group being designated as the alpha carbon atom. Examples of such preferred unsaturated alcohols are allyl alcohol, methallyl alcohol, 2-buten-1-ol, 2-ethyl-2-penten-1-ol, 2,3,5-trimethyl-2-hexen-1-ol, ethallyl, 2-decen-1-ol, 3,4-dibutyl-2-tridecen-1-ol, etc.

The system of nomenclature used to describe the compounds of the invention may be illustrated by the following examples. The compound having the following structure is termed 1-butenediol-3,4 carbonate:

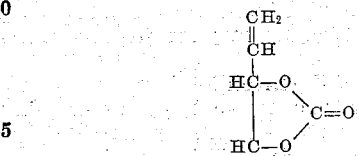

The compounds of the following structure is termed 2-butenediol-1,4 bis(ethyl carbonate)

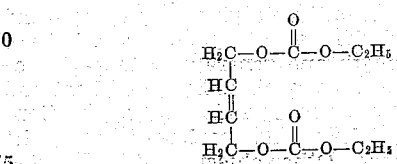

2-pentenediol-1,5 methyl ethyl dicarbonate has the following structure

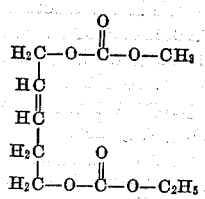

The following list contains a few representative examples of the preferred carbonates of unsaturated diols embraced by the invention:

1-propenediol-1,3 carbonate
1-butenediol-1,4 bis(allyl carbonate)
2-butenediol-1,4 bis(chloroallyl carbonate)
2-pentenediol-3,5 carbonate
1-cyclohexenediol-3,5 carbonate
1-butenediol-3,4 carbonate
2-pentenediol-1,5, methyl ethyl dicarbonate
1-cyclopentenediol-3,4 carbonate
2-chloro-1-butenediol-1,4 bis(pentyl carbonate)
2-butyl-1-butenediol-3,4 carbonate
2,4-heptadienediol-1,4 bis(isobutyl carbonate)
2-butenediol-1,4 butyl pentyl dicarbonate
3-hexenediol-1,5 bis(methallyl carbonate)
3-hexenediol-1,6 bis(isobutyl carbonate)
1-pentenediol-3,5 carbonate
3,4-hexadienediol-1,5 allyl methallyl dicarbonate
2-acetyl-3-pentenediol-1,5 bis(ethyl carbonate)
2,6-octadienediol-4,5 carbonate
2-hexenediol-5,6 carbonate
2,3-dimethyl-2-butenediol-1,4 methyl ethyl dicarbonate
2-methyl-2-pentenediol-1,5 bis(bromoallyl carbonate)
3-hexenediol-1,2 carbonate
3-acetoxy-4,6-octadienediol-1,5 bis(methyl carbonate)
2-heptenediol-4,5 carbonate The above-described unsaturated diols may be prepared by any suitable method. One method comprises the reduction with hydrogen of the corresponding acetylene diol which may be prepared from acetylene carbinols by the procedure described in U. S. Patent No. 2,162,676. The more preferred method, however, and the one generally used is to treat the corresponding allyl-type chloride with chlorine under high pressures and temperatures and then hydrolyze the chlorine atoms off the resulting unsaturated dichloride by heating the product with lime at high temperatures and pressures.

The carbonates of the unsaturated diol may be produced by any suitable method. The instability of carbonic acid, however, prevents its use in the production of the carbonates of the unsaturated diols so most of the methods involve the use of a stable derivative of the acid. Suitable derivatives of carbonic acid that may be used in the production of the compounds of the invention are carbamic acid, urea, urethane, carbonyl chloride, chloroformate, etc. One suitable method for producing the compounds is to treat a monoester of carbonic acid, produced by the esterification of carbamic acid or carbonyl chloride, with the desired unsaturated diol under known esterification conditions. Another method is to treat a haloformate, containing the desired $R_1$ radical, with the unsaturated diol under known reaction conditions.

The preferred method, however, for the production of the unsaturated diol esters of carbonic acid, because of its efficiency and relatively low cost, comprises treating the unsaturated dihydric alcohol with a diester of carbonic acid under such conditions that there is an exchange of the unsaturated diol for the alcohol groups of the carbonic acid diester. The reaction may be illustrated by the following equation showing the production of 1-butenediol-1,4 bis(ethyl carbonate)

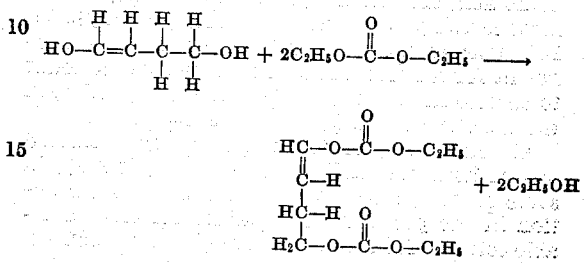

The diester of carbonic acid used in the above preferred process may be prepared by treating phosgene with the appropriate alcohol according to the procedure described in U. S. Patent No. 2,370,568. In some cases it may be advisable to use a mixed diester, one ester group of which results from the esterification of a low boiling alcohol such as methyl, ethyl alcohol. This is advisable as in such an ester exchange process it is best to maintain a convenient spread between the boiling points of the compounds to be separated in order that the low boiling alcohol may be readily driven off and the reaction readily carried to completion.

In the preferred process, illustrated by the above equation, the proportions of the reactants used will depend upon the type of reactants involved and the products desired. If a ring-type structure is to be formed according to the structure of the unsaturated diol, it is generally advisable to use a slight excess of one of the reactants. In most cases it will be advisable to use an excess of the diester of carbonic acid as the unreacted portion may be more easily recovered at the end of the process. The reaction proceeds very smoothly, however, when the unsaturated diol is maintained in excess.

In the production of the compounds where the ring structure is not to be expected and both hydroxyl groups of the unsaturated diol are to be esterified it is preferred to use slightly more than a double molar quantity of the diester of carbonic acid. In those cases where only one of the hydroxyl groups is to be esterified the proportions may generally be reduced to just a slight excess of the diester. The exact proportions to be used in each case, however, will depend upon the specific conditions of each preparation.

The process is preferably conducted in the presence of a catalyst. Generally any of the known catalysts used to speed up the esterification process may be used. Suitable catalysts are sodium methoxide, potassium ethoxide, ammonia, pyridine, p-toluene sulfonicacid, benzene sulfonic acid, etc. The more preferred catalysts are the alcoholates of the alkali metals such as sodium, potassium, lithium, etc. and the lower alcohols such as methyl, ethyl, butyl, isobutyl, propyl, etc. alcohols. The catalytic action may be due to the action of the alcoholates themselves or to the action of the alcoholate of the unsaturated diol formed by the action of the original alcoholate on the unsaturated dihydric alcohol. When alcoholates are used as catalysts, however, they must be maintained in the anhydrous conditions as they are readily hydrolyzed by water and disappear in the saponification of the diester.

The amount of the catalyst used will depend upon the derivative of carbonic acid used, the esterification constant of the unsaturated, dihydric alcohol and the speed of reaction desired. In general, amounts of catalysts ranging from .1 to 2 moles for every 100 moles of derivative of carbonic acid used in the process are employed. In most cases approximately one mole of catalyst per 100 moles of carbonic acid derivative will be sufficient for a normal reaction. The exact amount to be used in each case, however, will depend upon the specific conditions of each reaction.

Although the preferred reaction may be carried out without the addition of solvents, it may, in some cases be advantageous to conduct the reaction in the presence of a mutual solvent. Suitable solvents for the reaction are benzene, hexene, dioxane, pentane, etc., or mixtures thereof.

The temperature at which the preferred reaction may be carried out may vary as required by the nature of the reacting substances. In most cases the reaction may commence at a temperature as low as about 50° C. In general the maximum temperature will not exceed about 200° C. but some cases may require a temperature above that range. A preferred temperature range is between about 60° C. and 160° C. However, higher or lower temperatures may be used if needed or desired.

The time of the reaction will vary according to the type and amount of catalyst used, the temperature of reaction and the specific reactants being employed. In general the reaction time will lie between about 3 to about 8 hours. However, longer and shorter periods may be used and the exact time will be determined for each specific case.

The preferred reaction should be conducted under a blanket of an inert gas such as nitrogen to avoid exposure of the process to air and oxygen. Carbon dioxide may be used as the blanket gas in all cases except those wherein an alcoholate of an alkali metal such as sodium ethoxide is used as the catalyst in the reaction.

The reaction is executed in any convenient type of apparatus enabling intimate contact of the reactants, refluxing of the reaction mixture and later removal of the low boiling alcohol by distillation. The process may be carried out in batch, semi-continuous or continuous operation. When a continuous operation is employed, reactants continuously withdrawn from the reaction zone are preferably subjected to a substantially continuous product separating operation under conditions enabling the continuous recycling to the reaction zone of separated unreacted materials.

Upon completion of the reaction the low-boiling alcohol is first removed from the reaction mixture by means of distillation and the carbonate of the unsaturated diol is then removed from the reaction charge which will generally include the catalyst and the excess of the reactants, by any suitable means comprising such steps as, for example, distillation, washing, solvent extraction, filtration, ion-exchange resins and the like. In most cases the carbonates of the unsaturated diols will be clear liquids which can be readily separated from the reaction charge by distillation.

The monomeric carbonates of unsaturated diols produced in accordance with the preferred method described hereinabove find many important industrial applications. They can, for example, be used as plasticizers, tackifiers, lubricants and as intermediates in the synthesis of a large number of other valuable chemical compounds.

The monocarbonates or dicarbonates of the unsaturated diols find their greatest use, however, in being polymerized singly or with one another in a variety of proportions to produce tough, flexible resins having a general resistance to deteriorating influences such as light and heat which find use in the production of resinous articles, castings, laminates, etc.

Another of the important uses of the carbonates of unsaturated diols is their copolymerization with other unsaturated organic compounds such as the allyl-type and vinyl-type esters and ethers to produce resins having the same desired properties and uses discussed hereinabove.

A group of the unsaturated organic compounds with which the carbonates of the unsaturated diols may be copolymerized are the monoethylenic compounds, which contain a single polymerizable carbon-to-carbon double bond, of which an important subclass consists of those compounds containing in the molecule a terminal methylene group attached to carbon by an ethylenic double bond $CH_2=C<$. Examples of this class of compounds are styrene, alphamethyl styrene, many vinyl and allyl derivatives such as allyl acetate, allyl formate, and the nitriles and many of the esters of acrylic and alpha-substituted acrylic acids.

Another group of copolymerizable compounds consists of those compounds having two or more conjugated carbon-to-carbon double bonds, such as butadiene and substituted butadiene, as well as polymers of acetylene, such as vinyl and divinyl acetylene. Others are unsaturated cyclic compounds such as coumarone, indene, furfural and cyclohexene.

Some of the most important copolymerizable compounds, however, have two or more polymerizable non-conjugated double bonds. An important subclass consists of the unsaturated aliphatic polyesters of saturated polybasic acids, examples of which are divinyl, diallyl, and dimethallyl esters of oxalic, malonic, citric and tartaric acids. Another subclass consists of the unsaturated aliphatic polyethers of saturated polyhydric alcohols, such as the divinyl, diallyl and dimethallyl ethers of glycol, diethylene glycol, trimethylene glycerol and similar derivatives of diglycerol, mannitol, sorbitol, and the like. Another subclass consists of the unsaturated aliphatic organic acid polyesters of polyhydric alcohols, such as acrylic and methacrylic polyesters of glycol. Another subclass consists of the unsaturated aliphatic alcohol esters of the unsaturated aliphatic acids, such as the vinyl, allyl and methallyl esters of acrylic, methacrylic and the like. Still another class consists of the unsaturated polyesters of dibasic aromatic acids, such as divinyl, diallyl and dimethallyl esters of phthalic acid, isophthalic acid, and the naphthalene dicarboxylic acids. Instead of the esters and ethers, the corresponding sulfur and nitrogen compounds, i. e. thioesters, thioethers, amides and amines may be used.

The carbonates of the unsaturated diols, alone or when incorporated with other unsaturated organic compounds, may also be polymerized in the presence of already-formed plastics, including natural resins, cellulose derivatives and synthetic resins. Other modifiers, including plasticizers, stabilizers, lubricants, dyes, pigments and fillers, may be added to the monomers or mixtures thereof prior to polymerization or may be added during the polymerization process provided they do not chemically react with or otherwise adversely affect the ingredients of the reaction mixture. Otherwise, these modifiers may be added following polymerization. The nature and amount of the modifiers used will depend upon the particular carbonate involved, upon the method of polymerization and upon the intended use of the product.

The compounds may be polymerized in bulk in the presence or absence of a solvent or diluent. If a solvent is used the substance may be a solvent for the reactants and polymer, or may be a solvent for the reactants and a non-solvent for the polymer. Emulsifying, granulating and wetting agents may also be present. It is also possible to effect polymerization by atomizing the reactants or solution thereof in the form of a fine spray into a heated chamber containing an inert gas. It is likewise feasible to polymerize the novel compounds of the invention dispersed in the interstices in fibrous material such as a fabric.

Polymerization is usually energized by the application of heat, although both heat and light may be used, and in some cases, light is sufficient. Temperatures between about 60° C. and about 160° C. are preferred, although higher or lower temperatures can be used. The time of the polymerization treatment will vary depending upon the particular carbonate being polymerized, the method of polymerization and upon the degree of polymerization desired and the intended use of the product. Some of the carbonates as for example 2-butenediol-1,4 bis(ethyl carbonate) can be polymerized to hard, clear resins by the application of heat in only four days while others may take longer times even up to 12 or 15 days.

Atmospheric, reduced, or superatmospheric pressures may be used in the polymerization process. The process may also be carried out under a blanket of an inert gas such as nitrogen or carbon dioxide.

Catalysts may be added to hasten the polymerization. The preferred catalysts are those which are soluble in the polymerizable material. Benzoyl peroxide has been found very satisfactory. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides such as tertiary butyl hydroperoxide, peracetic acid, perphthalic acid, sodium perborates, sodium persulfates, etc. If desired, mixtures of polymerization catalysts can be used. The amount of the catalyst used will vary under the various conditions but ordinarily will be between about 0.01% and about 5% by weight of the material being polymerized, although it is not necessary to limit this range. In some cases it may be desirable to conduct the polymerization in the concurrent presence of both a catalyst and an inhibitor of polymerization for the purpose of controlling the rate thereof or of producing a product of certain desired properties.

The polymerization reaction can be carried to completion without substantial interruption or it may be stopped at any point short of completion. Incomplete polymerization may be used for the production of a syrup which may be further worked and eventually substantially completely polymerized. The syrup may, for instance, be transferred to a mold of any desired configuration and again subjected to polymerization conditions, or it may be used in coating operations, or in impregnating bibulous, e. g. fibrous material which in turn may be used in the production of laminates. Unreacted monomer may be separated from its mixture with polymer by solvent extraction, distillation or other methods. The separated polymer may then be worked up in any known or special manner.

The resinous products of the invention are characterized by a high quality strength and general resistance to deteriorating influences such as light and heat. When completely polymerized the resins may be made in the form of turnery shapes, sheets, rods, tubes, thin films, filaments, fibers, etc. Turnery shapes can be turned on a lathe, sawed, frilled, filed and punched. Some of the resins may also be used to prepare glass substitutes. The resins also have properties which make them useful in laminates, as interlayers or adhesives in safety glass, laminated wood and laminated paper and textile fabrics. In the form of cups, beakers, boxes and other flexible and rigid containers they have wide use. As partly polymerized syrups they may be used as textile assistants in the manufacture of cloth, lubricating, sizing and creasing-proofing the material in some instances, etc. They also may be used as plasticizers, as ingredients of lacquers, paints, enamels, etc.

To illustrate the manner in which the invention may be carried out the following examples are given. It is to be understood, however, that the examples are for the purpose of illustration and the invention is not to be regarded as limited to the specific carbonates of unsaturated diols being repaired or polymerized or the particular unsaturated organic compound with which it is being copolymerized.

*Example I*

Approximately .17 part of sodium is dissolved in about 4 parts of absolute ethyl alcohol and the mixture is added to about 85 parts of 1-butenediol-3,4 (ref. ind. $n_D^{20}$ 1.4633). Approximately 136 parts of diethyl carbonate are then added to the above mixture and the charge is placed in an apparatus equipped with a distillation column. The temperature is raised from about 96° C. to about 160° C. very slowly and then maintained at that temperature for approximately 7 hours. After the reaction is complete the low boiling ethyl alcohol is first removed from the reaction charge by distillation. 94.5 parts of ethyl alcohol are obtained which represents about a 91% recovery. The residue is taken up in about 87 parts of benzene and the resulting solution washed 3 times with 25 parts of water. The benzene solution is then distilled under reduced pressure. Benzene and water are obtained first, then the unreacted carbonate and then the final product 1-butenediol-3,4 carbonate. The 1-butenediol-3,4 carbonate boils at 132.5–133.7° C. at 18–20 mm. Hg ($n_D^{20}$ 1.4495, bromine number, 140 compared to calculated bromine number of 140).

1000 parts of the 1-butenediol-3,4 carbonate are combined with 2% by weight of benzoyl peroxide and subjected to a temperature of 65° C. for a period of four days. At the end of the heating period a hard, flexible, nearly colorless resin is obtained. The resin is exposed, for extended periods of time, to sunlight and inclement weather conditions as well as relatively high temperatures in a salt bath. Even after weeks of such treatment the resin shows little or no discoloration under the weather and light and very little discoloration or decomposition under the heat treatment.

Example II

Approximately .28 part of sodium is dissolved in about 8 parts of absolute ethyl alcohol and the mixture is added to about 88.5 parts of 2-butenediol-1,4 (ref. ind. $n_D^{20}$ 1.4787). Approximately 200 parts of diethyl carbonate are then added to the above mixture and the charge is placed in an apparatus equipped with a distillation column. The temperature is slowly raised to about 160° C. and maintained at that temperature for approximately 7 hours. After the reaction is complete the low boiling ethyl alcohol is removed from the reaction charge by distillation. The residue is taken up in about 87 parts of benzene and the resulting solution washed 3 times with 25 parts of water. The benzene solution is then distilled under reduced pressure of 18 mm. of Hg. Benzene and water are removed first, then the unreacted carbonate and then the final product 2-butenediol-1,4 bis(ethyl carbonate). The final product has a bromine number of 134 compared to calculated bromine number of 140.

1000 parts of the 2-butenediol-1,4 bis(ethyl carbonate) are then combined with 2% by weight of benzoyl peroxide and subjected to a temperature of 65° C. for a period of 5 days. At the end of the heating period a hard, flexible, colorless resin having a general resistance to long exposure of heat and light is obtained.

Example III

About .17 part of sodium is dissolved in about 4 parts of absolute ethyl alcohol and the mixture is added to about 85 parts of 2,4-hexadienediol-1,4. About 200 parts of diallyl carbonate are then added to the above mixture and the charge is placed in an apparatus equipped with a distillation column. The temperature is slowly raised to about 160° C. until the reaction is complete. The allyl alcohol is then removed from the reaction charge by distillation. The residue is then taken up in about 90 parts of benzene and distilled under reduced pressure. The final product obtained is 2,4-hexadienediol-1,4 bis(allyl carbonate).

The 2,4-hexadienediol-1,4 bis(allyl carbonate) is then treated with 2% by weight of benzoyl peroxide and heated for several days at 65° C. At the end of the heating period a hard, flexible colorless resin having a general resistance to deteriorating influences such as light and heat is obtained.

Example IV

About .28 part of sodium is dissolved in about 8 parts of absolute ethyl alcohol and the mixture is added to about 88 parts of 2-(hydroxymethyl)-1-propene-3-ol. About 200 parts of diallyl carbonate are then added to the above mixture and the charge is placed in an apparatus equipped with a distillation column. The temperature is raised to about 160° C. until the reaction is complete. The alkyl alcohol is then removed by distillation and the residue is taken up in benzene and distilled under reduced pressure. The final product obtained is 2-(hydroxymethyl)-1-propene-3-ol bis(allyl carbonate).

Example V

Following the procedure outlined in Example I 2-pentenediol-3,5 carbonate is obtained by treating 2-pentenediol-3,5 with diethyl carbonate; 2-butenediol-1,4 bis(chloroallyl carbonate) is obtained by treating 2-butenediol-1,4 with dichloroallyl carbonate; 1-cyclopentenediol-3,4 carbonate is obtained by treating 1-cyclopentenediol-3,4 with diethyl carbonate; 2-butyl-1-butenediol-3,4 carbonate is obtained by treating 2-butyl-1-butenediol-3,4 with diethyl carbonate.

Example VI 2-butenediol-3,4 bis(ethyl carbonate) is mixed with an equal quantity of diallyl phthalate and 2% by weight of benzoyl peroxide. After being subjected to polymerizing temperature of 65° C. for several days a hard, flexible, nearly colorless resin having the desired properties is obtained.

Example VII 2,4-hexadienediol-1,4 bis(allyl carbonate) is mixed with monomeric allyl acetate and 2% by weight of benzoyl peroxide. After being subjected to polymerization treatment for several days at 65° C. a hard, flexible resin having a general resistance to heat and light is obtained.

Example VIII

Following the procedure of Example VI 1-butenediol-3,4 bis(allyl carbonate) is copolymerized with diallyl diglycolate, methallyl 3-sulfolanyl ether, allyl chloride to obtain a hard resin of the desired properties discussed above.

I claim as my invention:

1. 2-butenediol-1,4 bis(ethyl carbonate) having the formula

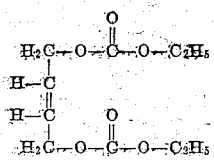

2. 2-(hydroxylmethyl)-1-propene-3-ol bis(allyl carbonate) having the formula

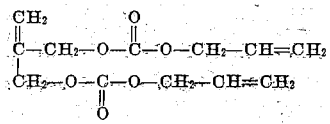

3. A carbonate of an open-chain, unsaturated dihydric alcohol containing no more than 20 carbon atoms wherein each of the two hydroxyl groups of the unsaturated diol is esterified by a member of the group consisting of carbonic acid and a monoester of (I) carbonic acid and (II) an alcohol ROH wherein R is an open-chain hydrocarbon radical containing from 1 to 18 carbon atoms, said unsaturated diol possessing at least one double bond between two carbon atoms of aliphatic character one of which is not more than two carbon atoms removed from a hydroxy-bearing carbon atom and having one double bond for each 6 carbon atoms in the chain.

4. A homopolymer of a carbonate of an open-chain, unsaturated dihydric alcohol containing no more than 20 carbons atoms wherein each of the two hydroxyl groups of the unsaturated diol is esterified by a molecule of a monoester of (I) carbonic acid and (II) an alcohol of the formula ROH wherein R is an open-chain hydrocarbon radical containing from 1 to 18 carbon atoms, said unsaturated diol possessing at least one double bond between two carbon atoms of aliphatic character one of which is not more than two carbon atoms removed from a hydroxy-bearing carbon atom and having one double bond for each 6 carbon atoms in the chain.

5. A homopolymer of a carbonate of an open-chain, unsaturated dihydric alcohol containing no more than 20 carbon atoms wherein each of the two hydroxyl groups of the unsaturated diol is esterified by a member of the group consisting of carbonic acid and a monoester of (I) carbonic acid and (II) an alcohol ROH wherein R is an open-chain hydrocarbon radical containing from 1 to 18 carbon atoms, said unsaturated diol possessing at least one double bond between two carbon atoms of aliphatic character one of which is not more than two carbon atoms removed from a hydroxy-bearing carbon atom and having one double bond for each 6 carbon atoms in the chain.

6. A copolymer of (I) a carbonate of an open-chain unsaturated dihydric alcohol containing no more than 20 carbon atoms wherein each of the two hydroxyl groups of the unsaturated diol is esterified by a member of the group consisting of carbonic acid and a monoester of carbonic acid and an alcohol ROH wherein R is an open-chain hydrocarbon radical containing from 1 to 18 carbon atoms, and (II) a polymerizable organic compound containing a single $CH_2=C<$ group, said unsaturated diol possessing at least one double bond between two carbon atoms of aliphatic character one of which is not more than two carbon atoms removed from a hydroxy-bearing carbon atom and having one double bond for each 6 carbon atoms in the chain.

7. A carbonate of an open-chain, unsaturated dihydric alcohol containing no more than 20 carbon atoms wherein each of the two hydroxyl groups of the unsaturated diol is esterified by a molecule of a monoester of (I) carbonic acid and (II) an alcohol of the formula ROH wherein R is an open-chain hydrocarbon radical having a double bond in the beta,gamma position and containing from 3 to 18 carbon atoms, said unsaturated diol possessing at least one double bond between two carbon atoms of aliphatic character one of which is not more than two carbon atoms removed from a hydroxy-bearing carbon atom and having one double bond for each 6 carbon atoms in the chain.

8. A homopolymer of the compound described in claim 7.

9. A copolymer of (I) a carbonate of an open-chain, unsaturated dihydric alcohol containing no more than 20 carbon atoms wherein each of the two hydroxyl groups of the unsaturated diol is esterified by a member of the group consisting of carbonic acid and a monoester of carbonic acid and a monohydric alcohol ROH wherein R is an open-chain hydrocarbon radical containing from 1 to 18 carbon atoms, and (II) an ethylenically unsaturated dissimilar polymerizable organic compound, said unsaturated diol possessing at least one double bond between two carbon atoms of aliphatic character one of which is not more than two carbon atoms removed from a hydroxy-bearing carbon atom and having one double bond for each 6 carbon atoms in the chain.

10. A neutral ester of carbonic acid and 1-butenediol-3,4 having the formula

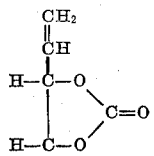

11. A homopolymer of a neutral ester of carbonic acid and 1-butenediol-3,4 having the formula

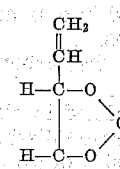

12. A polymer of a neutral carbonate of an unsaturated open-chain dihydric alcohol containing no more than 20 carbon atoms wherein each of the hydroxyl groups of the unsaturated diol is esterified by a member of the group consisting of carbonic acid and a monoester of carbonic acid and an alcohol ROH wherein R is an open-chain hydrocarbon radical containing from 1 to 18 carbon atoms, said unsaturated diol possessing at least one double bond between carbon atoms of aliphatic character one of which is not more than two carbon atoms removed from a hydroxy carbon atom and having one double bond for each six carbon atoms in the chain.

13. A carbonate of an open-chain unsaturated dihydric alcohol containing no more than 20 carbon atoms wherein each of the two hydroxyl groups of the unsaturated diol is esterified with a molecule of a monoester of carbonic acid and an alcohol of the formula ROH wherein R is an open-chain hydrocarbon radical containing from 1 to 18 carbon atoms, said unsaturated diol possessing at lease one olefinic linkage between two aliphatic carbon atoms at least one of which is not more than two carbon atoms removed from a hydroxy-bearing carbon atom and having at least one olefinic double bond for every 6 carbon atoms.

14. A carbonate of an open-chain unsaturated dihydric alcohol containing no more than 20 carbon atoms wherein both of the hydroxyl groups of the unsaturated diol are esterified by a single molecule of carbonic acid, said unsaturated diol possessing at least one olefinic linkage between two aliphatic carbon atoms at least one of which is not more than two carbon atoms removed from a hydroxy-bearing carbon atom and having at least one olefinic double bond for every 6 carbon atoms.

15. A copolymer of 2-butenediol-1,4 bis(ethyl carbonate) having the formula

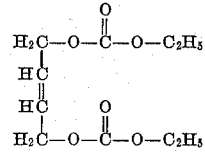

and an ester of an aromatic polybasic acid and a beta,gamma-ethylenically unsaturated alcohol.

16. A resin comprising a homopolymer of a carbonate of an open-chain unsaturated dihydric alcohol containing no more than 20 carbon atoms wherein both of the hydroxyl groups of the unsaturated diol are esterified with a single molecule of carbonic acid, said unsaturated diol possessing at least one olefinic linkage between two aliphatic carbon atoms at least one of which is not more than two carbon atoms removed from the hydroxy-bearing carbon atom and having at least one olefinic double bond for every 6 carbon atoms.

17. A carbonate of 2-butenediol-1,4 wherein each of the two hydroxyl groups of 2-butenediol-1,4 is esterified with a monoester of carbonic acid and an alcohol of the formula ROH wherein R is an open-chain hydrocarbon radical having an ethylenic double bond in the beta,gamma position relative to the hydroxyl group and containing from 3 to 18 carbon atoms.

18. A homopolymer of the carbonate defined in claim 17.

19. A copolymer as defined in claim 9 wherein the ethylenically unsaturated dissimilar polymerizable compound is an ester of an aromatic polybasic acid and a beta,gamma-ethylenically unsaturated alcohol.

DAVID E. ADELSON.

REFERENCES CITED

The following references are of record in the file of this patent:

UNITED STATES PATENTS

| Number | Name | Date |
| --- | --- | --- |
| 2,210,817 | Peterson | Aug. 6, 1940 |
| 2,231,936 | Medick | Feb. 18, 1941 |
| 2,387,933 | Muskat et al. | Oct. 30, 1945 |
| 2,399,287 | Muskat et al. | Apr. 30, 1946 |
| 2,401,581 | Muskat et al. | June 4, 1946 |